US012042062B2

(12) United States Patent
Fishwick

(10) Patent No.: US 12,042,062 B2
(45) Date of Patent: Jul. 23, 2024

(54) STIRRUP POCKET

(71) Applicant: Nicholas Charles Fishwick, San Francisco, CA (US)

(72) Inventor: Nicholas Charles Fishwick, San Francisco, CA (US)

(73) Assignee: Nicholas C Fishwick, San Francisco, CA (US)

( * ) Notice: Subject to any disclaimer, the term of this patent is extended or adjusted under 35 U.S.C. 154(b) by 78 days.

(21) Appl. No.: 17/857,955

(22) Filed: Jul. 5, 2022

(65) Prior Publication Data

US 2024/0008659 A1 Jan. 11, 2024

(51) Int. Cl.
*A47D 13/02* (2006.01)
*B68C 3/00* (2006.01)

(52) U.S. Cl.
CPC ........... *A47D 13/029* (2022.08); *A47D 13/02* (2013.01); *B68C 3/00* (2013.01); *B68C 2003/005* (2013.01)

(58) Field of Classification Search
CPC .. A47D 13/025; A47D 13/027; A47D 13/029; A47D 13/02; B68C 2003/0091; B68C 3/00
See application file for complete search history.

(56) References Cited

U.S. PATENT DOCUMENTS

| | | | | |
|---|---|---|---|---|
| 52,589 A * | 2/1866 | Nichols | B68C 3/00 | 54/47 |
| 4,281,503 A * | 8/1981 | Teel | B68C 3/02 | 54/49 |
| 2007/0245696 A1* | 10/2007 | Madill | B68C 3/00 | 54/47 |

OTHER PUBLICATIONS

Kelty USA; Kelty Journey PerfectFit Child Carrier; https://www.youtube.com/watch?v=jBXPXI0q3zM; accessed Jan. 2, 2024; published Mar. 7, 2018. (Year: 2018).*

ClevrPlus; Amazon.com website; ClevrPlus Canyonero Camping Baby Backpack Hiking Kid Toddler Child carrier with Stand and Sun Shade Visor, Army Green; https://www.amazon.co.uk/ClevrPlus-Canyonero-Camping-Backpack-Warranty/dp/B08WWMWCNV/ref=sr_1_1?th=1; accessed Jan. 2, 2024; published Feb. 18, 2021. (Year: 2021).*

Blane Bachelor; Baby Got Backpack, accessed Jan. 2, 2024; published Mar. 5, 2020; Sierra: The Magazine of the Sierra Club; https://www.sierraclub.org/sierra/2020-2-march-april/gear-guide/baby-got-backpack. (Year: 2020).*

* cited by examiner

*Primary Examiner* — Daniel J Colilla

(57) ABSTRACT

The invention provides a new stirrup design for children, that secures the foot preventing unwanted movement, thus making the footing more stable and safer, preventing bouncing off, sliding forward, or sliding sideways. In the event the passenger dismounts, the invention is specially designed to release its grip on the foot enabling easy removal. In the event the passenger falls backward, the invention has a specific malleable design to enable the foot to pivot up and back, thus preventing the foot from getting entangled or trapped.

4 Claims, 13 Drawing Sheets

1 - Rigid Side

2 - Malleable Side

3 - Rigid Floor

4 - Hinged Edge

5 - Hinged Edge

Fig 1: Stirrup Pocket
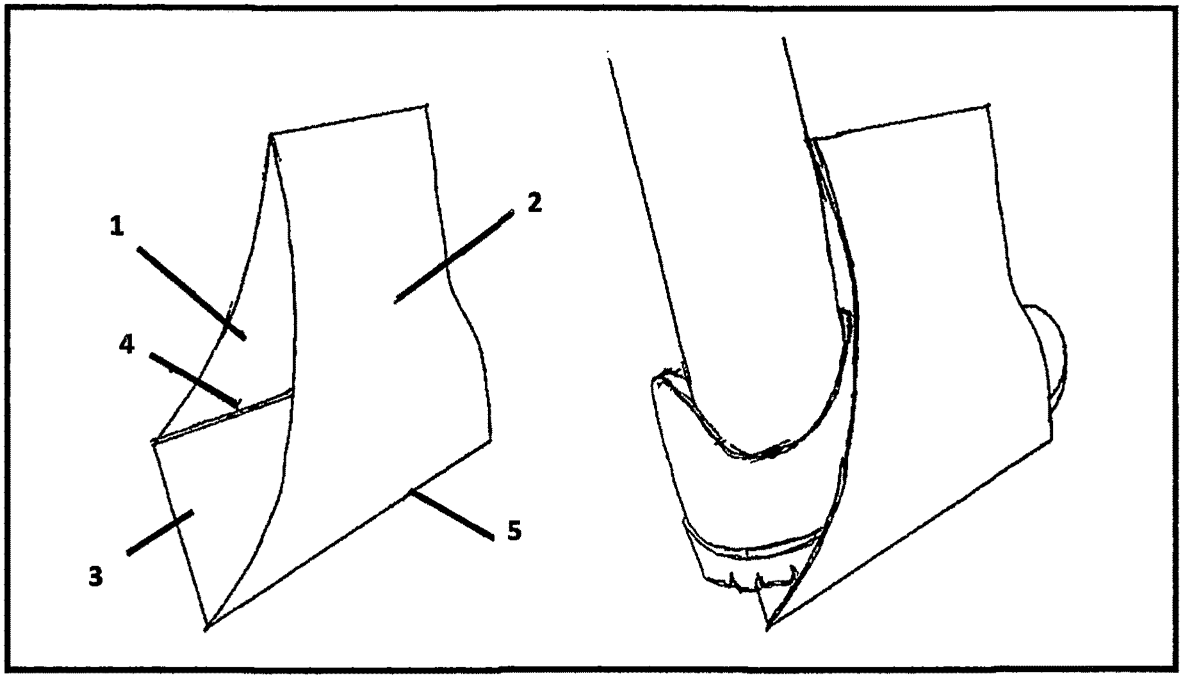
1 - Rigid Side
2 - Malleable Side
3 - Rigid Floor
4 - Hinged Edge
5 - Hinged Edge

Fig 2: Malleable Convex Side
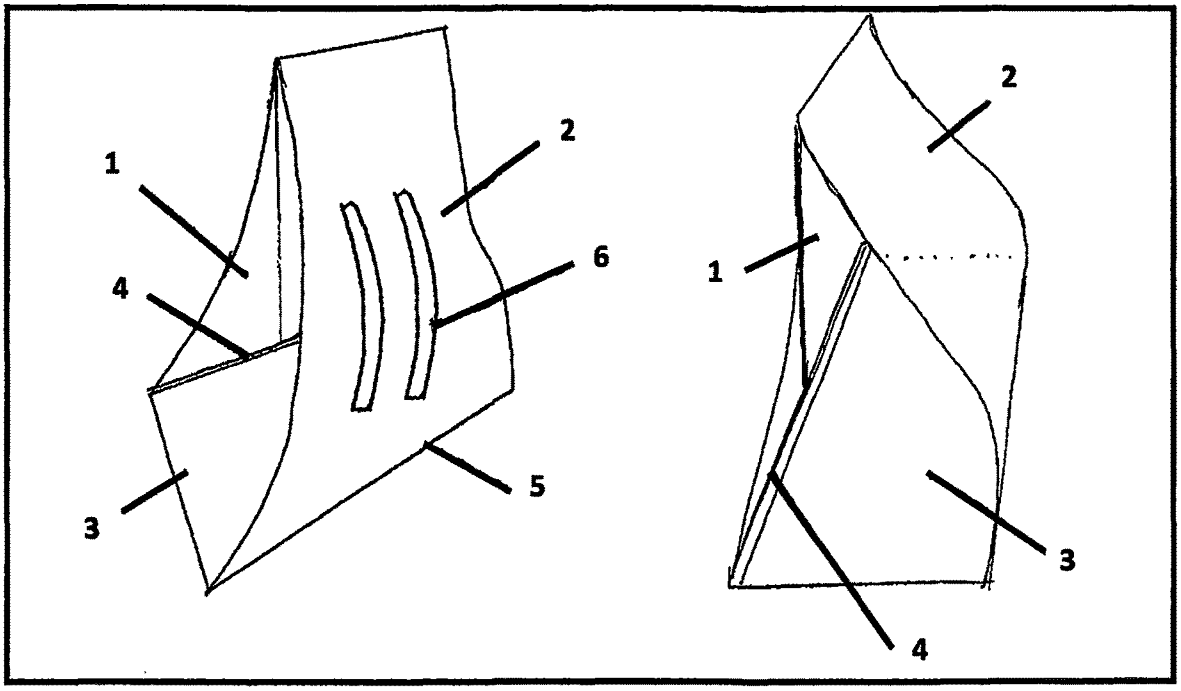
1 - Rigid Side
2 - Malleable Side
3 - Rigid Floor
4 - Hinged Edge
5 - Hinged Edge
6 - Batons

Fig 3: Conical Space Design for Securing the Foot
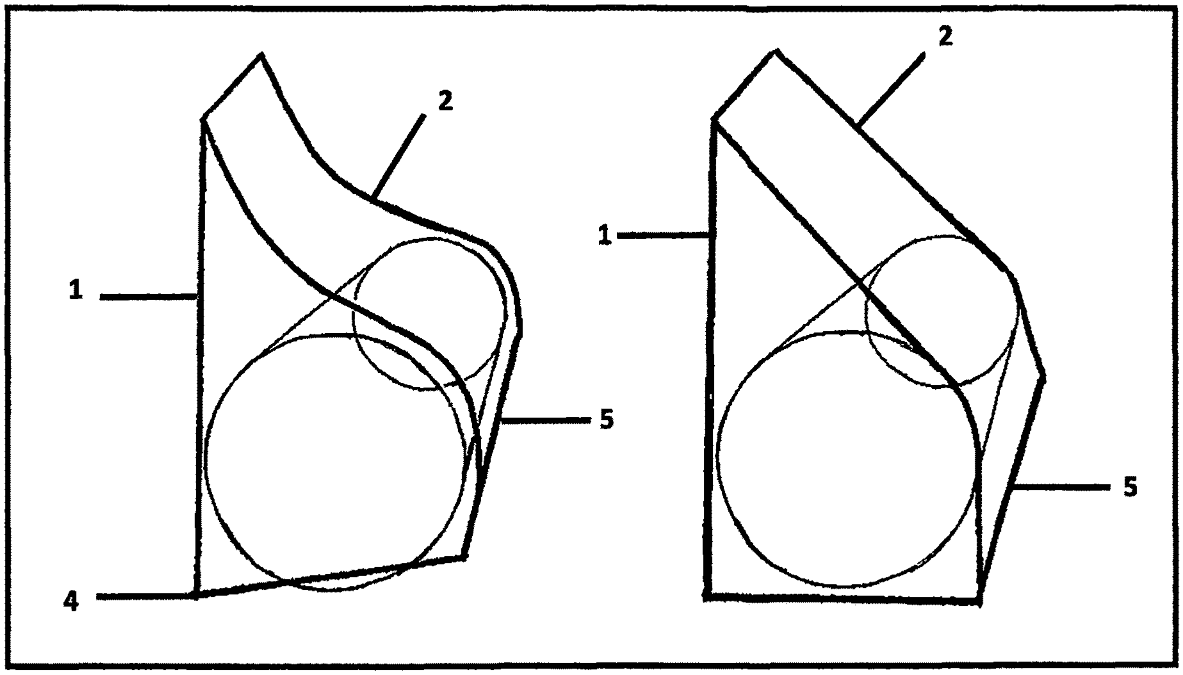
1 - Rigid Side
2 - Malleable Side
3 - Rigid Floor
4 - Hinged Edge
5 - Hinged Edge

Fig 4: Supporting Multiple Foot Positions
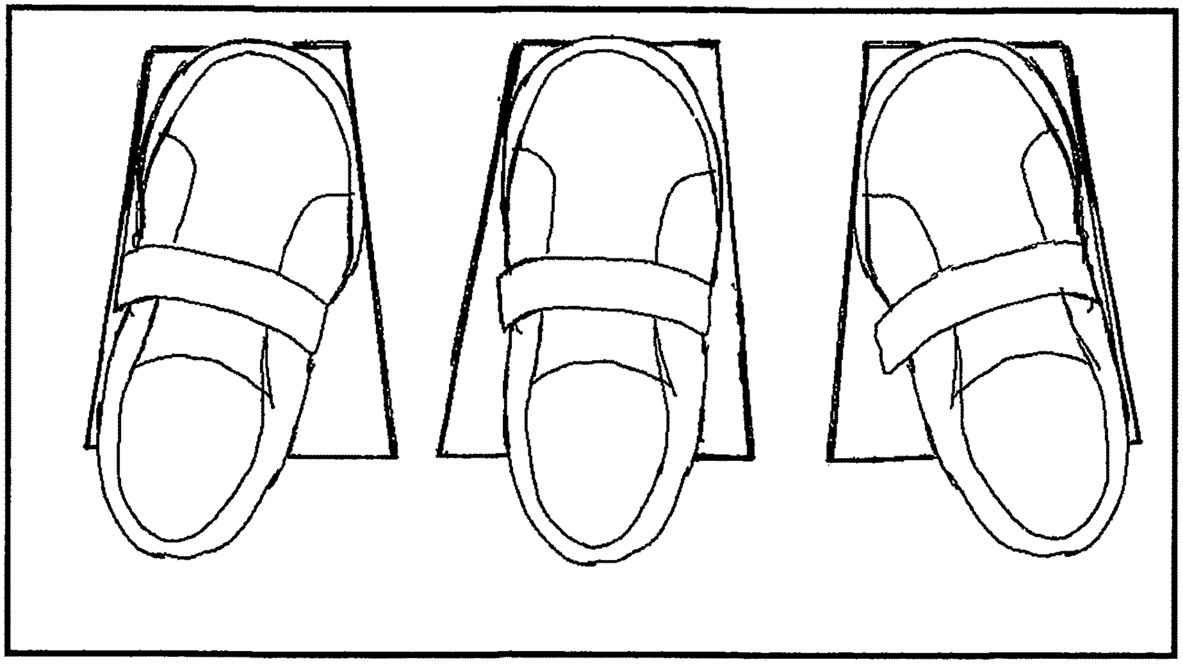

Fig 5: Problem Solve - Preventing Lateral Slippage
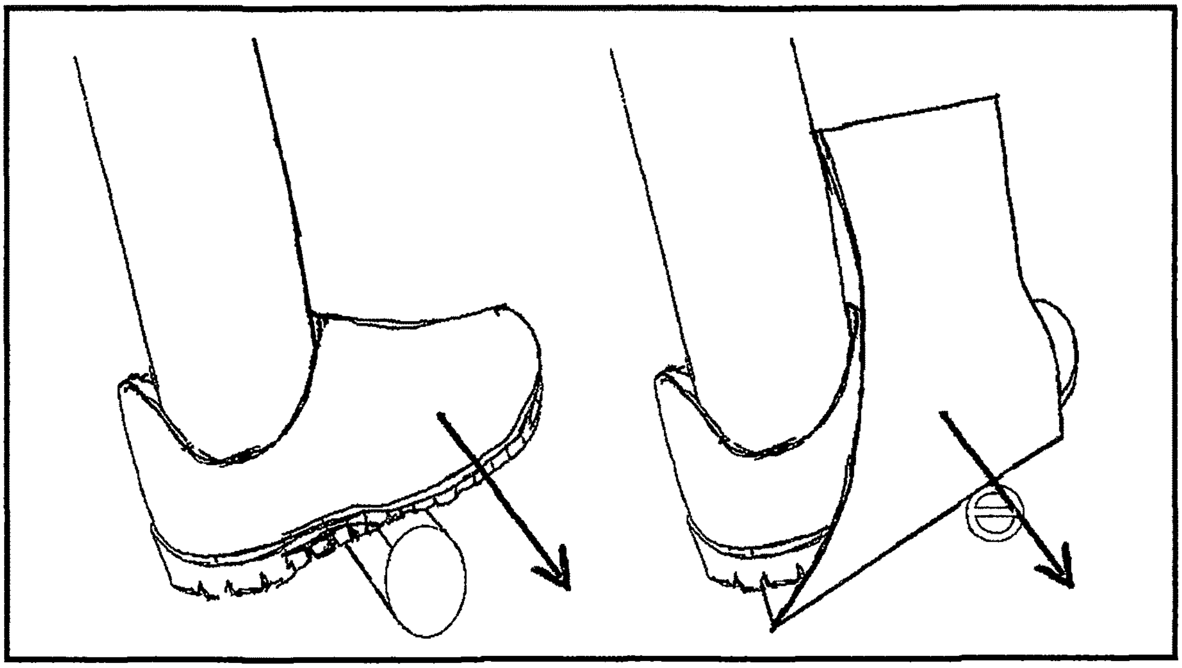

Fig 6: Problem Solve - Preventing Forward Slippage
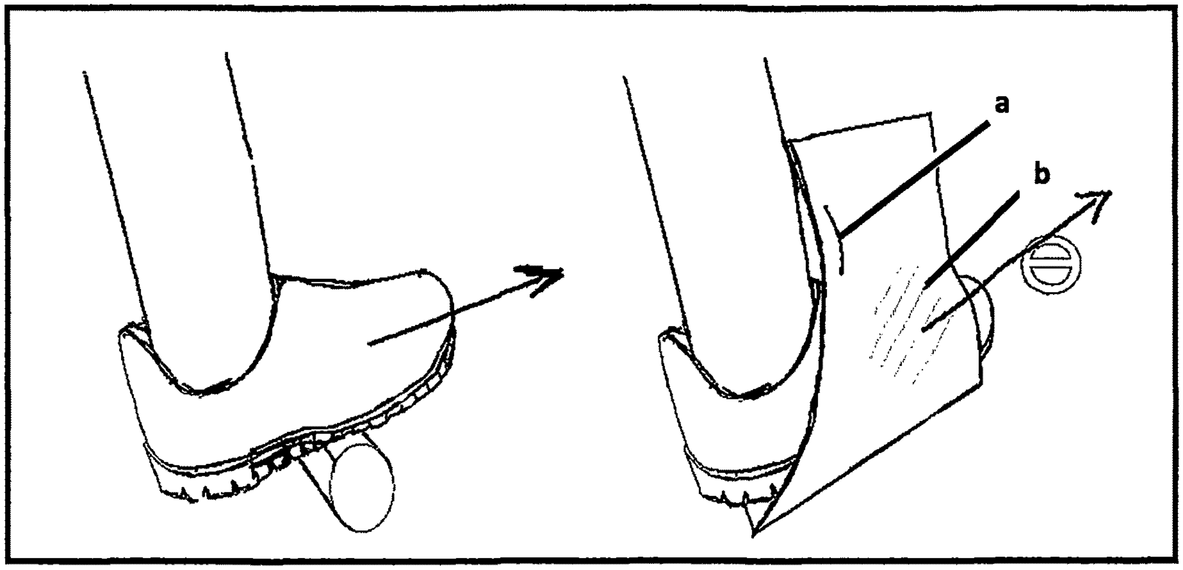
a- Malleable Side (2)
b - compression

Fig 7: Problem Solve - Preventing Foot Traveling Through Stirrup
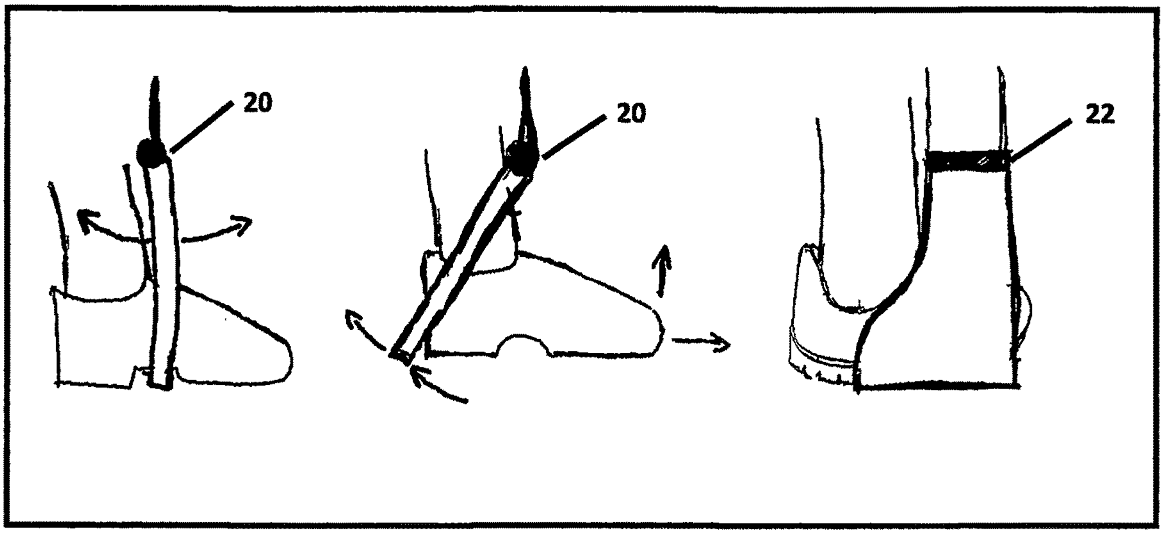
20 - pivot point
22 - Invention pivot point

Fig 8: Foot Trapped in Traditional Stirrup
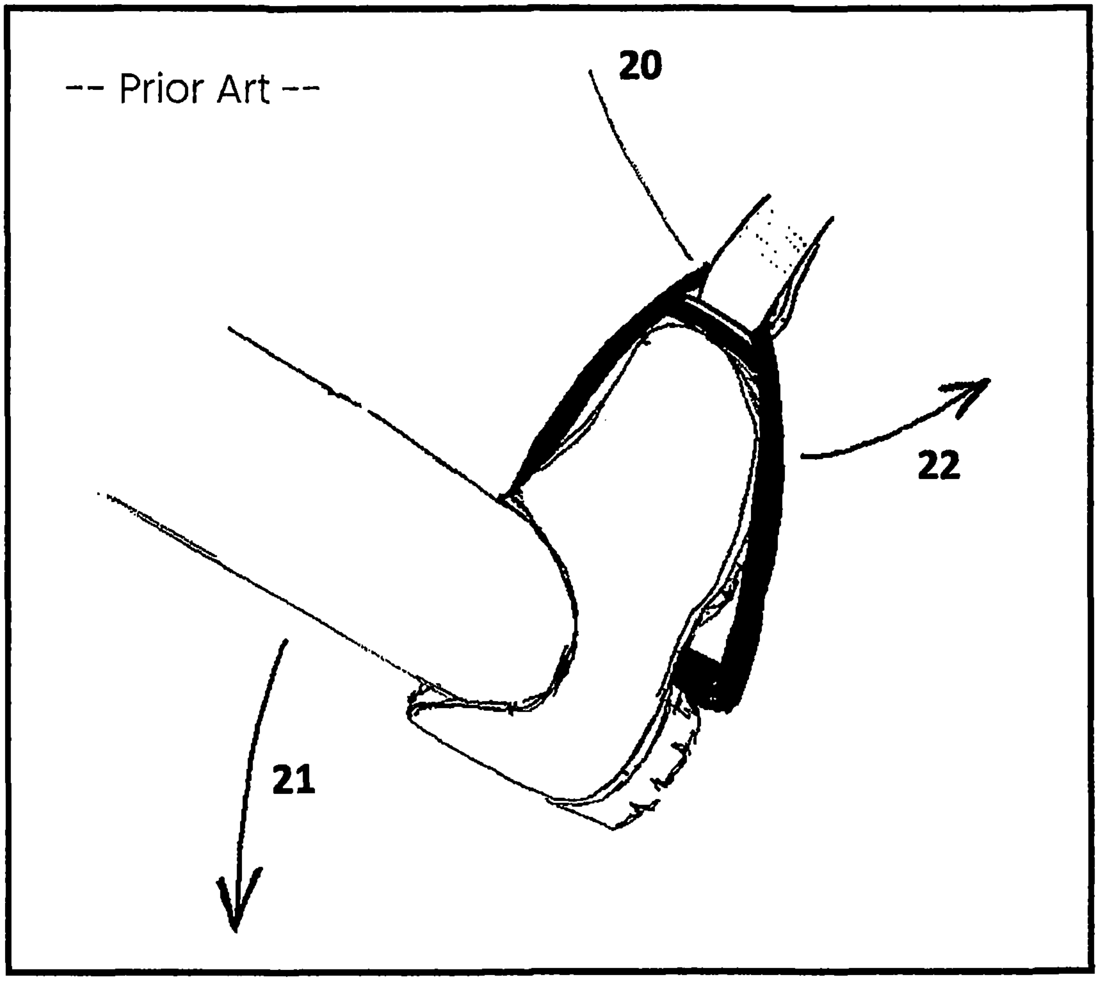
20 - Toe capture
21 - pivot trajectory
22 - leg trajectory

Fig 9: Problem Solve - Side View: Preventing Foot Getting Trapped
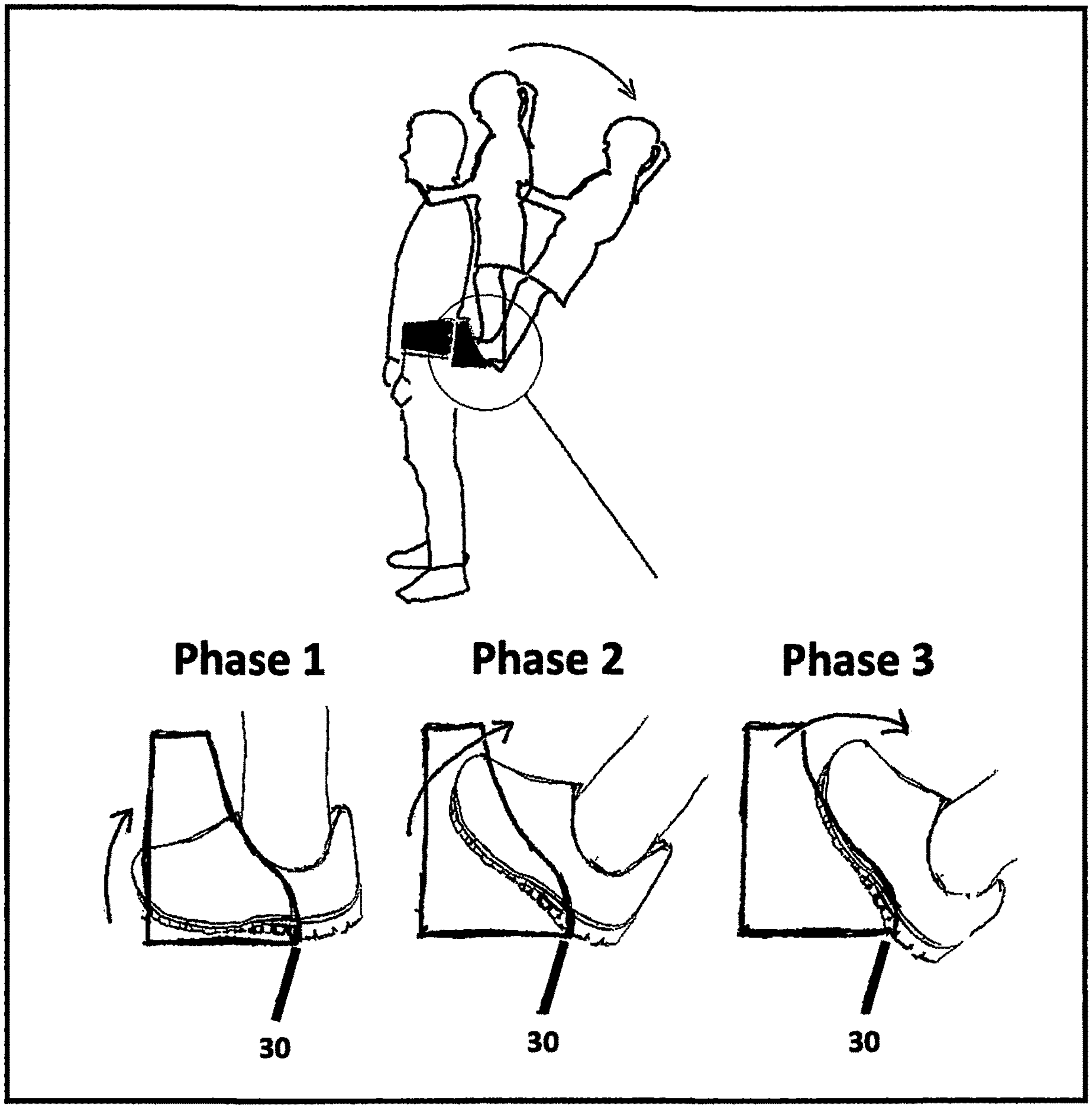
30 - Pivot Point Fig 10: Problem Solve - Front View: Preventing Foot Getting Trapped
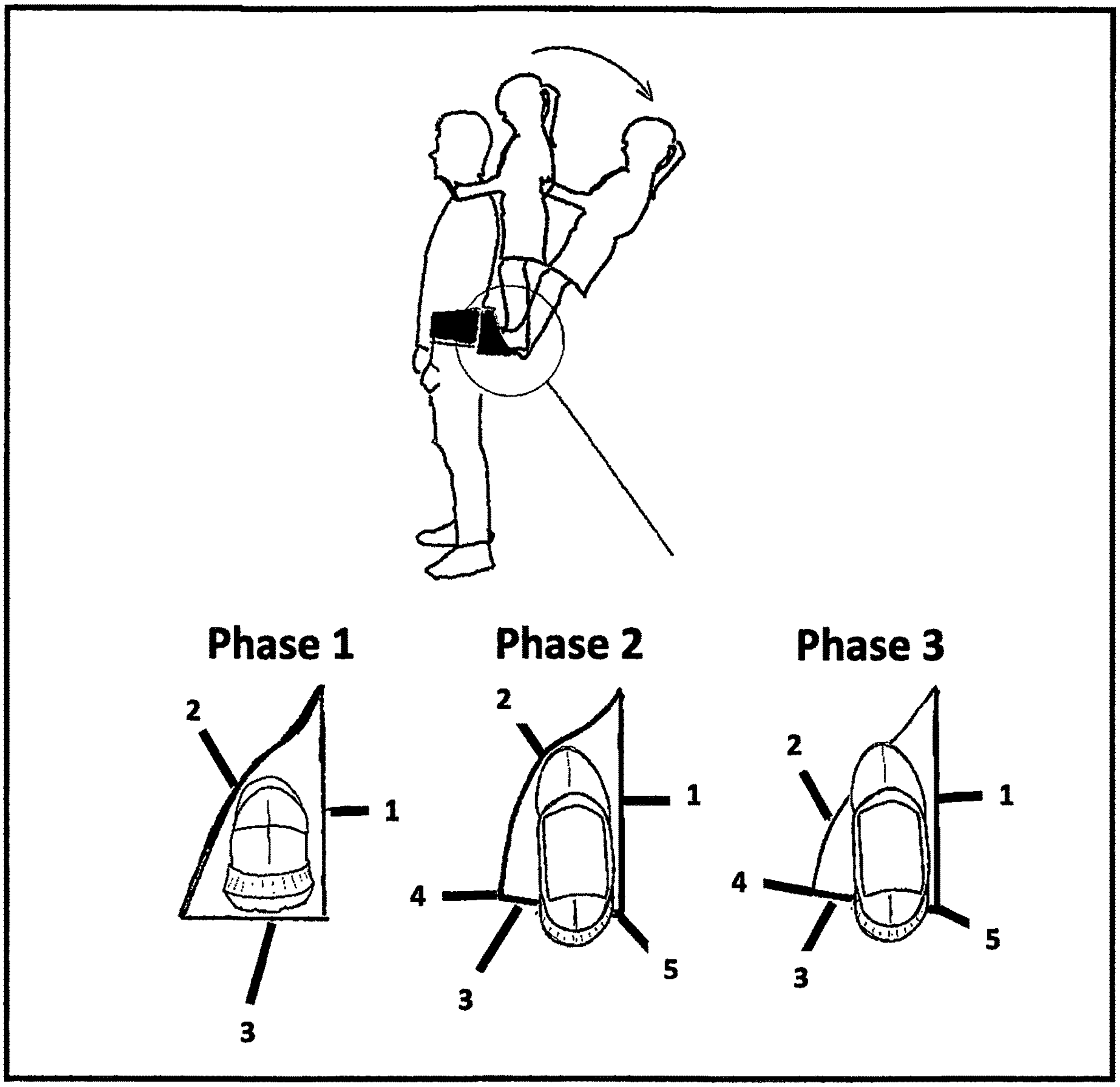
1 - Rigid Side
2 - Malleable Side
3 - Rigid Floor
4 - Hinged Edge
5 - Hinged Edge

Fig 11: Foldable 'Stirrup Pocket' for storage
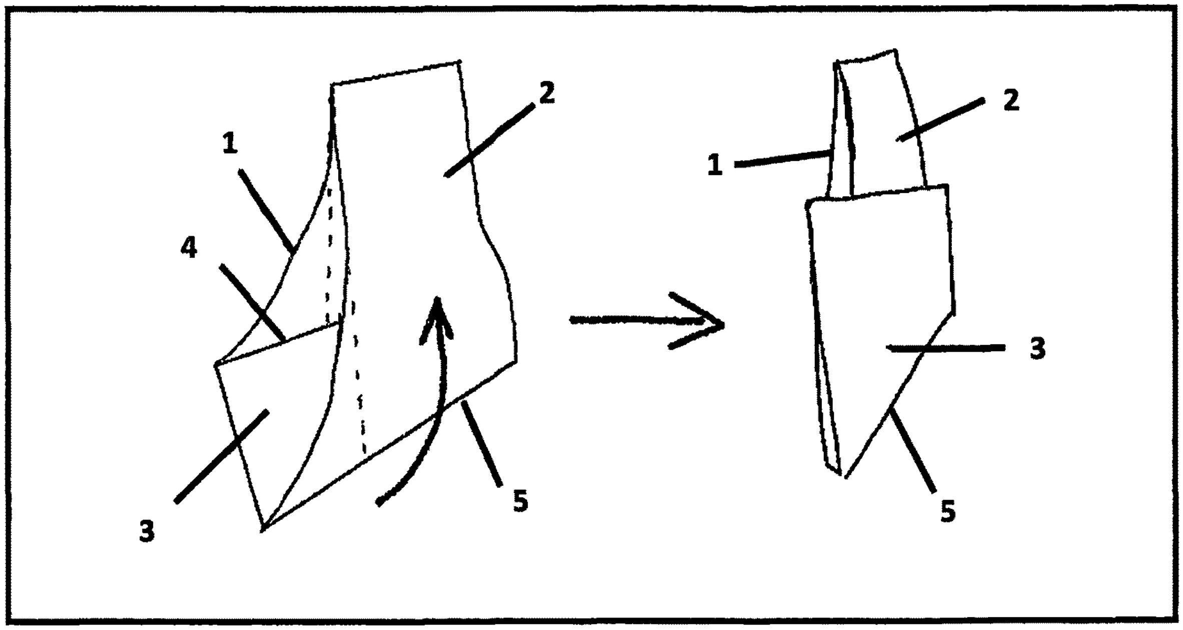
1 - Rigid Side
2 - Malleable Side
3 - Rigid Floor
4 - Hinged Edge
5 - Hinged Edge

Fig 12: Connecting 'Stirrup Pocket' to Child Carrier
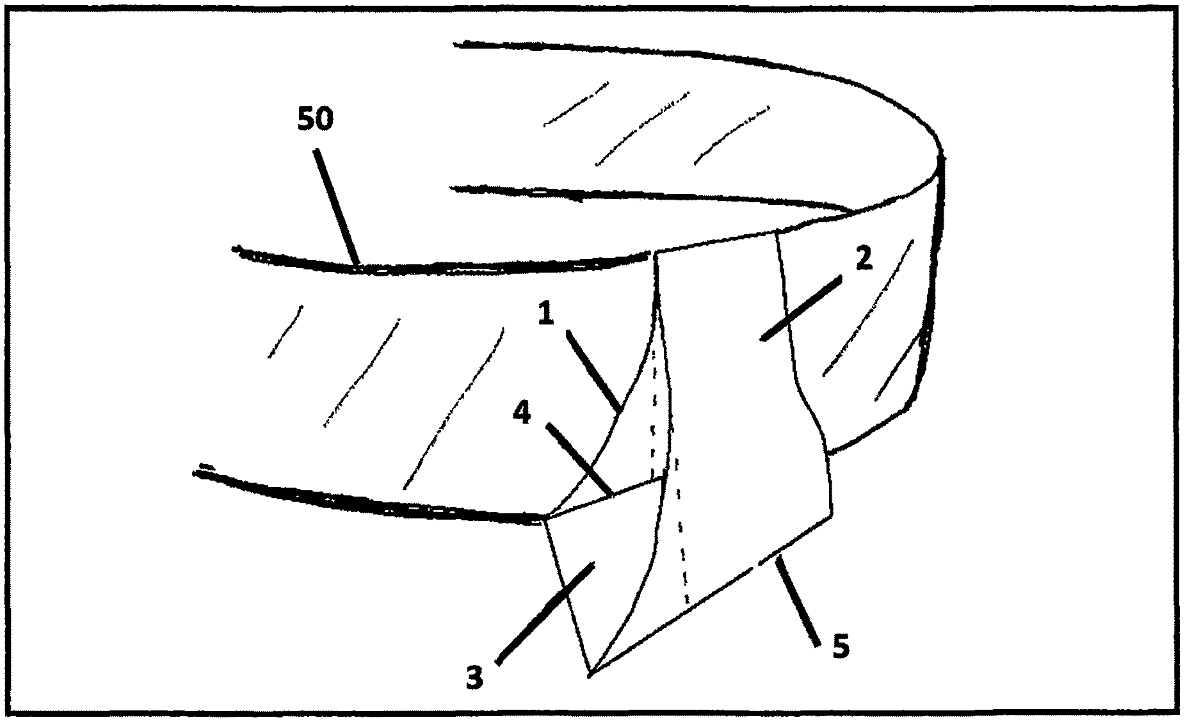
1 - Rigid Side
2 - Malleable Side
3 - Rigid Floor
4 - Hinged Edge
5 - Hinged Edge
50 - Load Bearing Belt

Fig 13: Connecting 'Stirrup Pocket' to a Saddle
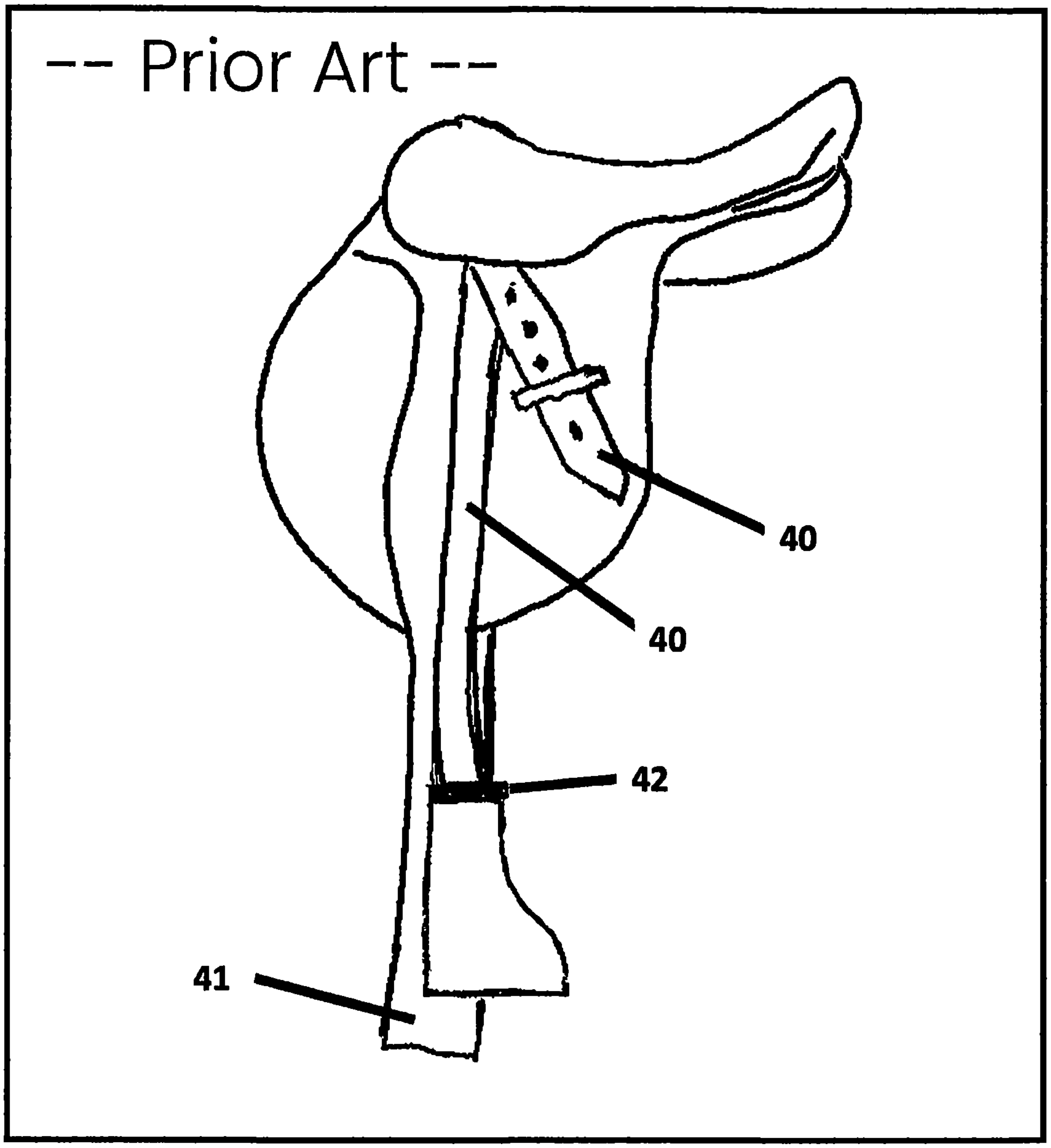
40 - Stirrup Strap
41 - Girth
42 - Metal Buckle

STIRRUP POCKET

BACKGROUND OF INVENTION

There have been multiple patents and products launched for the bearing of a child on an adult's back, with the child assuming the standing position. The ideas and products have all utilized one of three methods to support the child's feet and weight: a bar or bars or pegs [insert patent reference], ledges [insert my patent ref, and K patent ref], and stirrups [U.S. Pat. No. 8,733,602B1]. These methods have inherent safety and usability problems, potentially resulting in injury.

BRIEF SUMMARY OF INVENTION

The purpose of the invention is to provide a method of supporting and securing the foot of a child when said child is receiving a ride and the foot is performing the primary load bearing task. The invention provides easy access for inserting the foot, and automatically securing the foot preventing it from bouncing off, sliding forward, or sliding sideways off the support, which can cause injury. In the event the passenger dismounts, the invention is specially designed to release its grip on the foot enabling easy removal. In the event the passenger falls backward, the invention is specially designed to enable the foot to pivot up and back, thus preventing the foot from getting entangled or trapped.

BRIEF DESCRIPTION OF DRAWINGS

FIG. 1: Stirrup Pocket

FIG. 2: Malleable Convex Side

FIG. 3: Conical Space Design for Securing the Foot

FIG. 4: Supporting Multiple Foot Positions

FIG. 5: Problem Solve—Preventing Lateral Slippage

FIG. 6: Problem Solve—Preventing Forward Slippage

FIG. 7: Problem Solve—Preventing Foot Traveling Through Stirrup

FIG. 8: Foot Trapped in Traditional Stirrup

FIG. 9: Problem Solve—Side View: Preventing Foot Getting Trapped

FIG. 10: Problem Solve—Front View: Preventing Foot Getting Trapped

FIG. 11: Foldable 'Stirrup Pocket' for storage

FIG. 12: Connecting 'Stirrup Pocket' to Child Carrier

FIG. 13: Connecting 'Stirrup Pocket' to a Saddle

REFERENCES AND PRIOR ART

The following inventions are considered and some referred to in the descriptions below:

KR200453927Y1: [정승혜정현석] The present invention relates to a child carrier, which consists of a waist belt and a saddle, and the waist belt can be of two types, clip or velcro, and the saddle is inserted into the waist belt so that the baby can sit. It makes it easy to carry a child who is easy to wear, store, carry and use.

KR200481152Y1: [이진섭] The present invention relates to an infant carrier. Specifically, according to one embodiment of the present invention, a waist wearing part is fixed in tight contact with a waist of a wearer;

U.S. Pat. No. 8,733,602B1: [Wesley DUNN] Embodiments of a child carrier for carrying a child in a standing position on the back of the wearer are disclosed. According to various embodiments, the child carrier can comprise a rigid or substantially rigid frame, and a rigid or substantially rigid platform, configured for a person to stand upon, extending outwardly from a lower region of the frame.

U.S. Pat. No. 8,733,602B1: [Brooke Bostic] In an example embodiment, a child carrier apparatus for supporting and carrying a standing child is provided. The apparatus comprises a waist-belt assembly releasably securable about the waist of an individual in engagement with the individual's hips to prevent downward movement of the waist-belt assembly when the child is supported by the child carrier apparatus, and at least one step formation on the waist-belt assembly for supporting feet or shoes of the child when the child is carried by the child carrier apparatus.

U.S. Pat. No. 8,056,779B1: [Robert Brunwin] A device for carrying a child piggyback upon an adult wearer, having a back plate which is positioned against the lower back of the adult wearer. A saddle extends rearward from the back plate for holding a seated child. A waist belt extends from the back plate and around the waist of the adult wearer. Stirrups hold the feet of the child and are supported from the waist belt. Major shoulder straps, each having an apex, extend from the back plate and extend over the shoulders of the adult wearer. A mid belt extends horizontally around both the adult wearer and child. Minor shoulder straps extend from the mid belt, over the shoulders of the child, and are attached near the apex of the major shoulder straps to hold the child securely in place against the back of the adult.

US20150028069A1: [Nicholas Fishwick] In an example embodiment, a child carrier apparatus for supporting and carrying a standing child is provided. The apparatus comprises a waist-belt assembly releasably securable about the waist of an individual in engagement with the individual's hips to prevent downward movement of the waist-belt assembly when the child is supported by the child carrier apparatus, and at least one step formation on the waist-belt assembly for supporting feet or shoes of the child when the child is carried by the child carrier apparatus.

ÉTRICAL Safety Stirrups: A commercially available safety stirrup for young riders. They resemble a traditional stirrup with an elongated shape, and an enclosed rigid cage around the toe area, thus positioning the foot correctly in the stirrup and preventing the foot from traveling through the stirrup. They are rigid in construction.

Gaston Mercier Hooded Stirrups: A commercially available safety stirrup that is enclosed. Is has a long and wide floor, is designed with a leather shell that protects the foot. It is a rigid construction.

Peacock Safety Stirrups: A commercially available safety stirrup in the style of a traditional stirrup, but with the outer side being a rubberized band that can disconnect from the stirrup in a fall thus freeing the foot.

DETAILED DESCRIPTION OF INVENTION

FIG. 1 illustrates the fundamental design of the invention, dubbed 'stirrup pocket'. It is an asymmetric elongated triangular tube with a wide opening for inserting the foot, and a narrow opening at the toe end. The invention, consists of a Rigid Inner Side (1) that is connected to the load bearing device (eg saddle, or weight bearing belt). The Rigid Inner Side (1) provides the weight bearing to the invention. The Rigid Inner Side (1) is connected to the Rigid Floor (3) via a hinged edge (4). The Rigid Floor (3) is connected on its other side to a Malleable Outer Side (2) via another Hinged edge (5). The Malleable Side faces outward, and is made of a pliable material (including but not limited to soft leather, canvass, or malleable plastic). The Malleable side is connected at the top to the Rigid Inner Side (1).

In embodiments, where the Invention is mounted to load bearing device the Rigid Inner Side (1) and Rigid Floor (3) form an angle of 90 degrees approximately (precision is not required).

In a second embodiment where the device is attached via a buckle at the top to straps, the Rigid Inner Side (1) and Rigid Floor (3) still form an angle of 90 degrees approximately (precision is not required). In both cases the fundamentals components of the invention remain the same. The Malleable Outer Side (2) is forms the Hypotenuse of the triangle, it is longer than the other sides, which is a fundamental principal to the invention.

The right hand side of FIG. 1 illustrates how a foot should be inserted into the invention. The Invention is designed to enable:

1. the easy inserting of the foot,
2. the gripping of the foot during use,
3. the easy extraction of the foot during a controlled dismount, and
4. the safe extraction of the foot in an accidental uncontrolled dismount.

The Invention is designed for the foot to be easily inserted (a challenge for stirrups) and also secure the foot by gripping it during use. FIG. 2 and FIG. 3 illustrate that the key to achieving these two properties is rooted in the two hinges (4, 5) and the Malleable Outer Side (2).

The Malleable Side (2) is shaped to bow outward when the invention is bearing weight, that is before the invention is supporting the rider's weight. FIG. 2 shows that the bowing form of the Malleable Side (2) can be ensured through the properties of the material it is made with: malleable plastics can be made with a default shape when "at rest". For other materials, such as soft leather or canvas, addition Curved Batons (6) can be added to create the bowed convex shape needed in the Malleable Side (2). As seen in FIG. 2.

The inside space created by the shape of the Invention is conical, it is higher and wider at the mouth of the Invention and gets progressively narrower and shallower to toe-end, where it is narrowest and most shallow. This conical space is created by the shape of the Rigid Floor (3) and shape of the Malleable Side (2). This can be seen in FIG. 3.

FIG. 3 shows that the mechanism for securing the foot inside the Invention during use, is not wedging the foot into a conical space. The Invention uses the two hinged edges (4 and 5), in conjunction with the Malleable Side (2) to create a larger space when at rest, and a smaller space when in use. The foot can easily insert into this larger space. When the rider's weight is then applied to the Rigid Floor (3) the angle at the Hinged Edge (4) increases to 90 degrees, the Rigid Floor (3) descends and the Malleable Side (2) straightens (less bowed) clamping onto the foot/shoe at the bridge and toe area, while being free at the ankle and heal area. This compression on the bridge and toe area of the foot, prevents unwanted movement, secures the foot in place, without applying so much pressure that the foot cannot be withdrawn with urgency.

Removing the foot leisurely, lift the foot removing, weight and pressure from the Rigid Floor (3), this removes the compression applied by the Malleable Side (2), and the foot can slide out.

FIG. 4 shows left foot, top down on the Rigid Floor (3). FIG. 4 shows the wide open mouth of the Invention allows for multiple comfortable foot positions. When standing on an adults back, the open mouthed design enables the child to position the feet so that they are not i) toes digging into the adults back. ii) not splayed too wide as to be uncomfortable for the child.

One of the challenges of peg based foot supports and shelf based foot supports (U.S. Pat. No. 8,733,602B1: Brooke Bostic, KR200453927Y1: 정승혜정현석) is that the feet are not secured to the support. Bouncing during the normal walking conveyance can lead to the foot traveling on the support in unwanted ways. This can lead to discomfort and the foot losing purchase, which can lead to accidents.

FIG. 5 illustrates how the Invention prevents unwanted lateral movement in two ways:

1) the compression applied by the Invention on the bridge of the foot keeps the amount of unwanted foot traveling on the support, and minimizes any vertical travel associated with bouncing.
2) The Malleable Side (2) prevents unwanted foot travel laterally, also preventing the foot from slipping off the support, and preventing accidents and injury associated with that.

One of the challenges of peg based foot supports for child carriers and the shelf based foot supports (U.S. Pat. No. 8,733,602B1: Brooke Bostic, KR200453927Y1: 정승혜정현석) is that the feet are not secured to the support. Bouncing during the normal walking conveyance can lead to the foot traveling on the support and can lead the foot losing purchase and accidents. One concern is the foot slipping forward. This is possibly mitigated with healed shoes, but many young person shoes today have contagious unhealed soles. The Invention prevents this unwanted foot movement. FIG. 6 illustrates how the invention prevents unwanted forward foot travel.

The Invention prevents unwanted forward movement in two ways:

1) the compression applied by the Invention (b on FIG. 6) on the bridge of the foot keeps the amount of unwanted foot traveling on the support, and minimizes any vertical travel associated with bouncing. Minimizing the vertical travel means the shoe is remains in contact with the Rigid Floor (3) and thus friction is preventing unwanted movement.
2) The Malleable Side (2) prevents unwanted foot travel forward, it is a barrier to the foot sliding forward.

Many commercially available, and patented child carriers use traditional stirrups for the child to stand on. FIG. 7 illustrates a potential risk and challenge that small children have with stirrups. A challenge with the traditional stirrup for small children and beginners, whether standing or sitting, is the potential for the heal of the foot to accidentally travel through the stirrup, potentially trapping the foot during a dismount. FIG. 7 illustrates that during travel the up/down bouncing motion can lift the foot inside the stirrup, and move the foot forward. The stirrup can knock on the leg's shin and pendulum swing under the foot to the heal. This is partly due to the pivot-point (20) at the top of the stirrup being in a parallel plane to the foot itself, enabling a pendulum swing of the stirrup forward and back. For a standing child/passenger this a serious problem and can lead to accidents and even injury.

The Invention overcomes this problem with three mechanisms:

1) the elongated pocket design means for the heal to travel through the invention would have to swing a lot further than a traditional stirrup
2) the compression applied by the Invention on the bridge of the foot keeps the amount of unwanted foot traveling on the support, and minimizes any vertical travel associated with bouncing. Minimizing the vertical travel means the shoe is remains in contact with the Rigid Floor (3) and thus friction is preventing unwanted movement.
3) the Invention pivot point (22) is perpendicular to the foot, hence it would swing sideways not forward and back An additional concern of the traditional stirrup is that the foot can get trapped or wedged. FIG. 8 illustrates the second challenge. Analysis of statements from horse riders, who have experienced their foot getting trapped in a traditional stirrup when dismounting or during a fall, tells us that the foot gets trapped by the base of the stirrup on the sole of the foot and the toe getting trapped at the top off the stirrup. Because the traditional stirrup, and commercially available safety stirrups (ÉTRICAL Safety Stirrups, Gaston Mercier Hooded Stirrups, Peacock Safety Stirrups) are rigid in design, there is potential for the shoe to get wedged in the stirrup, as illustrated by FIG. 8. Additionally as the passenger descends, the stirrup simply pendulums away from the rider, thus given them little to no resistance against which to leverage in order to free their foot.

Thus preventing the foot from getting trapped while the child passenger is dismounting leisurely and more importantly during a fall situation, is a key consideration of the Invention.

FIG. 9 and FIG. 10 illustrate what happens from the side (FIG. 10) and from the front (FIG. 11) when the rider falls backwards and the toe of the foot rises inside the Invention. From FIG. 10, the pivot point (30) is pivot point of the foot, the heal falling and the toe rising inside the invention.

For both FIG. 10 and FIG. 11:

Phase 1 is the foot at rest;

Phase 2 the foot's toe is rising inside the Invention;

Phase 3 the foot's toe is still rising but the toe is free of the Malleable Side (2)

For shoes inside the Invention, during Phase 2, where the toe is still inside the Invention and rising, it pushes up against the inside of the Malleable Side (2). Unlike a traditional stirrup (and the commercially available safety stirrups) the Malleable Side (2) is not rigid. As the foot pressing up on the Malleable Side (2), the Malleable Side (2) deforms, rising with the foot, enabling the foot pass through. This is enabled by the Inside Hinged Edge (5) and the Outside Hinged Edge (4)—these hinges allow the Rigid Floor (3) to rise upwards allowing the Malleable Side (2) to deform even more, and accommodate the rising foot. Thus the foot's toe end rubs against the inside of the Malleable Side (2), passing through the Invention, and is not trapped by it.

This behavior of the sides and hinged edges of the Invention prevent the foot from getting wedged (as with a traditional stirrup, and some of the existing safety stirrups), and thus enables the foot to slide out of the Invention during a fall, enabling the rider to easily free their feet and preventing injuring. Unlike any of the rigid construction stirrups available.

Another consideration for parents is easy of storage and packing the child caring devices. The Invention is designed to ease this by folding.

FIG. 11 illustrates how the Invention folds flat for packing. The Malleable Outer side (2) can be folded in on itself. In conjunction with the hinged edges (4,5) the Rigid Floor (3) lifts up, pivoted on hinged edge (4) to fold flat against the Inner Rigid Side (1). Thus the Stirrup Pocket can be folded flat. Unlike any of the rigid construction stirrups available.

One embodiment of the invention is for use with child carriers, where the child is standing. FIG. 12 illustrates how the Invention would be used in conjunction with a Child Carrier designed to convey a standing child—piggyback style.

Child carriers available on the market, and prior inventions (e.g. U.S. Pat. No. 8,733,602B1 [Brooke Bostic], U.S. Pat. No. 8,056,779B1: [Robert Brunwin]) use a combination of on harnesses for the adult upper body and a load bearing belt for the waist. The Invention (Stirrup Pocket) can attach to these child carriers via a metal buckle connected to Rigid Inner Side (1) via strapping to the load bearing belt. Alternatively, and preferably, the Invention would be attached with the Rigid Inner Side (1) being completely bonded to load bearing waist belt (50).

A second embodiment of the invention is for use when the child is being carried sitting. For example on horse back, or for example on a parents back in seat or saddle type device. FIG. 12, illustrates how the Invention connects via a metal buckle connected to the Rigid Inner Side (1) to the saddle's Stirrup Leather strap (40). Note that, while a traditional stirrup lies flat against the Girth (41), making it difficult to insert the foot, the invention hangs parallel to the Girth (41), making it easy for the rider to insert the foot. A second distinction is that traditional stirrups are symmetrical, in the anticipation of hanging in free space, and hence must be balanced. The Invention is asymmetrical, has a heavier inside than outside. It is designed for child riders with shorter legs. The invention does not hang own free space, but rests against the horse's side, against the Girth.

The invention claimed is:

1. A stirrup device for use while standing or sitting, comprising:

three sides to form an elongated triangular pocket configured to receive a foot, wherein the three sides comprise:

a rigid inner side (1) connected by a first hinged-like connection (4) to a rigid floor (3);

a malleable outer side (2) connected at the top by a second hinge-like connection to the top of the rigid inner side, and connected at the bottom by a third hinge-like connection to the rigid floor (3); and the rigid floor (3) configured wide at a proximal end and narrow at a distal end, creating a conical space to receive the foot that is long enough to support the foot from heel to the ball of the foot when the foot is inserted;

whereby, when weight is applied to the rigid floor (3), the malleable outer side (2) is configured to straighten thereby clamping onto the foot in the stirrup, and whereby the stirrup forms a right-angled triangle with the rigid floor (3) perpendicular to the rigid inner side (1).

2. The stirrup device of claim 1 wherein the rigid inner side is positively attached to an unyielding section of a load-bearing waist belt.

3. The stirrup device of claim 1 wherein the outer malleable side (2) includes one or more attached batons to shape the outer side so that it is convex when weight is not applied to the rigid floor (3), thereby providing easy access when inserting the foot.

4. The stirrup device of claim 1 wherein the rigid inner side (1) is formed by an unyielding section of a load-bearing waist belt a hinged edge connects the unyielding section of the load-bearing waist belt to top the malleable outer side (2), wherein the first hinged-like connection (4) is formed between the unyielding section of the load-bearing waist belt and the rigid floor (3); and the second hinge-like connection is formed between the unyielding section of the load-bearing waist belt and the malleable side (2).

* * * * *